United States Patent
Würmli et al.

(10) Patent No.: US 10,059,627 B2
(45) Date of Patent: Aug. 28, 2018

(54) COMBINATION OF TERNARY BINDERS WITH AQUEOUS EPOXY RESIN SYSTEM

(71) Applicant: SIKA TECHNOLOGY AG, Baar (CH)

(72) Inventors: Fabio Würmli, Wädenswil (CH); Thomas Moser, Zürich (CH); Kurt Roth, Erlinsbach (CH); Daniela Hesselbarth, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 56 days.

(21) Appl. No.: 14/905,656

(22) PCT Filed: Jul. 14, 2014

(86) PCT No.: PCT/EP2014/065041
§ 371 (c)(1),
(2) Date: Jan. 15, 2016

(87) PCT Pub. No.: WO2015/007684
PCT Pub. Date: Jan. 22, 2015

(65) Prior Publication Data
US 2016/0152522 A1    Jun. 2, 2016

(30) Foreign Application Priority Data

Jul. 16, 2013 (EP) ..................................... 13176717

(51) Int. Cl.
| | | |
|---|---|---|
| *B32B 27/38* | (2006.01) | |
| *C09J 163/00* | (2006.01) | |
| *B05D 3/02* | (2006.01) | |
| *C08L 63/00* | (2006.01) | |
| *C04B 28/04* | (2006.01) | |
| *C04B 28/14* | (2006.01) | |
| *C08G 59/50* | (2006.01) | |
| *C08G 59/54* | (2006.01) | |
| *C04B 28/06* | (2006.01) | |
| *C04B 28/16* | (2006.01) | |
| *C04B 111/62* | (2006.01) | |

(52) U.S. Cl.
CPC .............. *C04B 28/04* (2013.01); *C04B 28/06* (2013.01); *C04B 28/14* (2013.01); *C04B 28/16* (2013.01); *C08G 59/504* (2013.01); *C08G 59/54* (2013.01); *C04B 2111/62* (2013.01)

(58) Field of Classification Search
CPC ......... C04B 28/14; C04B 28/06; C04B 28/16; C04B 7/02; C04B 7/32; C04B 14/06; C04B 14/28; C04B 22/008; C04B 24/2623; C04B 24/281; C04B 2111/62; C08G 59/54; C08G 59/504

USPC .................. 428/414, 413; 156/330; 427/386; 523/401
See application file for complete search history.

(56) References Cited

U.S. PATENT DOCUMENTS 6,107,368 A * 8/2000 Roland .................... C04B 28/02
                                                              523/130
6,602,924 B1 * 8/2003 Chiang ................. C04B 24/003
                                                              521/100

FOREIGN PATENT DOCUMENTS

| EP | 0434214 | A2 | 6/1991 |
| EP | 0789439 | A1 | 7/1997 |
| JP | 03-069538 | A * | 3/1991 |
| JP | 03-069538 | A | 3/1991 |
| JP | H07 315907 | A | 12/1995 |

OTHER PUBLICATIONS

Office Action, and English translation of Office Action dated Dec. 29, 2016 corresponding to Chinese Patent Application No. 201480040211.6, 18 pages.
English Translation of International Preliminary Report on Patentability dated Jan. 19, 2016 corresponding to International Patent Application No. PCT/EP2014/065041, 11 pages.
English Translation of International Search Report dated Nov. 3, 2014 corresponding to International Patent Application No. PCT/EP2014/065041, 2 pages.
International Search Report dated Nov. 3, 2014 corresponding to International Patent Application No. PCT/EP2014/065041, 3 pages.
Written Opinion of the International Searching Authority dated Nov. 3, 2014 corresponding to International Patent Application No. PCT/EP2014/065041, 5 pages.
Office Action, and English translation of Office Action dated Mar. 29, 2017 corresponding to European Patent Application No. 14738837.5, 7 pages.
Office Action, and English translation of Office Action dated Aug. 14, 2017 corresponding to Chinese Patent Application No. 201480040211.6, 12 pages.

(Continued)

*Primary Examiner* — William K Cheung
(74) *Attorney, Agent, or Firm* — Dentons US LLP

(57) ABSTRACT

A multi-component composition is described that includes: A) a binder component (A) including at least one epoxy resin, B) a hardener component (B) including at least one amine compound as an amine hardener, and C) a solid component (C) including a hydraulic inorganic binder, wherein the hydraulic inorganic binder is a ternary binder composed of aluminous cement, calcium sulfate, and optionally Portland cement, wherein the solid component (C) includes 2 to 30 wt % aluminous cement, 1 to 16 wt % calcium sulfate, and 0 to 20 wt % Portland cement. The multi-component composition is suitable in particular as a self-leveling floor-leveling compound for a floor covering or as a mortar.

25 Claims, No Drawings

(56) References Cited

OTHER PUBLICATIONS

Office Action, and English translation of Office Action dated Nov. 16, 2017 corresponding to Chinese Patent Application No. 201480040211.6, 10 pages.

* cited by examiner

COMBINATION OF TERNARY BINDERS WITH AQUEOUS EPOXY RESIN SYSTEM

CROSS-REFERENCE TO PRIOR APPLICATIONS

This application is a National Stage of PCT/EP2014/065401, filed Jul. 14, 2014, and designating the United States (published on Jan. 22, 2015, as WO 2015/007684A1), which claims priority under 35 U.S.C. § 119 to European Patent Application No. 13176717.0, filed Jul. 16, 2013, each hereby expressly incorporated by reference in its entirety and each assigned to the assignee hereof.

TECHNICAL FIELD

The invention relates to a multicomponent composition, to a method for coating, joining, sealing, or grouting with the multicomponent composition, to the product produced therefrom, and to the use of the multicomponent composition as mortar or coating, more particularly for a floor covering.

PRIOR ART

Multicomponent compositions based on epoxy resins and on cement have already been known for many years. As far as the prior art is concerned, reference may be made, for example, to EP-A1-0786439. With the development of water-thinnable amine hardener components for epoxy resins, these systems have experienced substantial onward development.

The ECC (epoxy-cement-concrete) system may be produced by addition of epoxy resins, preferably emulsifiable in water, and a hardener to cement paste and inorganic additives. Within this system, the curing reactions of the cement and the epoxide component run in parallel, with a thermoset network forming from the epoxy resin in the presence of a hardener. Compositions of this kind have multivarious advantages, such as, for example, better workability of the fresh mortar, better adhesion of the fresh mortar and solid mortar to the substrate, better water retention capacity, enhanced freeze/deicing salt resistance, and, depending on the epoxide component used, better elasticity of the solid mortar.

The ECC systems in present-day use generally have a decisively high level of organic binder components, i.e., of epoxy resin and amine hardener, of 4 wt % or more. These systems exhibit very good properties for the products obtainable from them, in respect, for example, of compressive strength, adhesive strength, shrinkage, and surface moisture. Nevertheless, the applications properties and/or workability of these compositions are not good.

Through reduction in the amount of epoxy resin and amine hardener in the composition from around 4 wt % to around 1 wt % it has been possible to achieve a much-improved workability. This, however, is to the detriment of the properties of the products obtainable from the composition, such as compressive strength, adhesive strength, shrinkage, and surface moisture. Consequently there is a demand for systems that provide products having good properties and at the same time are amenable to reasonable processing. At the same time, reducing the required amount of relatively costly epoxy resins and amine hardeners is likewise desirable.

JP H07-315907 A relates to a composition comprising an epoxy resin, a hardener, Portland cement, calcium aluminate cement, gypsum, and a lithium compound.

PRESENTATION OF THE INVENTION

The object of the invention is therefore that of providing an ECC composition which no longer has the disadvantages described above. The intention more particularly is to provide a multicomponent composition which can be used as mortar or floor coating, which exhibits excellent properties in respect of compressive strength, adhesive strength, shrinkage, and surface moisture, and which at the same time displays sufficient workability. Another object was to keep the amount of epoxy resin required as small as possible. The object has surprisingly been achieved through the use of a ternary binder.

The invention therefore provides a multicomponent composition comprising
A) a binder component (A) comprising at least one epoxy resin,
B) a hardener component (B) comprising at least one amine compound as amine hardener, and
C) a solid component (C) comprising a hydraulic inorganic binder,
where the hydraulic inorganic binder is a ternary binder composed of high-alumina cement, calcium sulfate, and optionally Portland cement and the solid component (C) comprises 2 to 30 wt % of high-alumina cement, 1 to 16 wt % of calcium sulfate, and 0 to 20 wt % of Portland cement.

Through the use of the ternary binder it is possible surprisingly, even for small amounts of epoxy resin and amine hardener, of less than 2 wt %, for example, to obtain products having very good properties, in respect, for example, of compressive strength, adhesive strength, shrinkage, and surface moisture. Achieved in particular is a very high compressive strength, which is otherwise achievable only with relatively large amounts of epoxy resin and amine hardener. Also evident are an effective adhesion and a very low shrinkage. Furthermore, sufficient workability is obtained.

The multicomponent compositions of the invention are notable, moreover, for good chemical resistance and effective adhesion to moist or wet substrates. As a result of the rapid reduction in surface moisture, the possibility for recoating is rapidly enabled.

Preferred embodiments of the composition are reproduced in the dependent claims. The invention also provides a method for coating, joining, sealing, or grouting with the composition, products produced therefrom, and the use of the multicomponent composition as mortar or coating, more particularly as self-leveling flooring compound, for a floor coating.

WAY OF PERFORMING THE INVENTION

Compound names beginning with "poly" denote substances which formally per molecule contain two or more of the functional groups which occur in their names. The compound may be monomeric, oligomeric, or polymeric. A polyamine, for example, is a compound having two or more amino groups. A polyepoxide is a compound having two or more epoxy groups.

Epoxy resins are polyepoxides, i.e., compounds having two or more epoxide groups. Epoxy resins are preferably oligomeric or polymeric compounds. Epoxy resins are sometimes also used in conjunction with what are known as reactive diluents. Reactive diluents are mono- or polyepoxides. The reactive diluents possess a viscosity lower than the epoxy resin used, and serve to reduce the viscosity of the epoxy resin used. The optional reactive diluent is likewise incorporated into the organic binder matrix, and for the purpose of determining the epoxy resin weight is therefore counted here among the epoxy resins.

The epoxide equivalent weight (EEW) can be determined according to DIN 53188 and is reported in g/eq.

The composition of the invention comprises a multicomponent composition, meaning that the composition comprises a plurality of, more particularly three or more, individual components, which are mixed with one another only at use. Before use, the components are stored separately, in order to prevent spontaneous reaction. For use, the components are mixed with one another. Mixing is followed by the start of inorganic hydration reactions and organic crosslinking reactions, leading ultimately to the curing of the mixture.

The composition of the invention comprises a binder component (A), a hardener component (B), and a solid component (C). It may be a three-pack composition, consisting only of these three components, as is also preferred. Alternatively, as and when required, the composition may comprise one or more further, additional components.

It is preferred for the binder component (A) and/or the hardener component (B) to comprise water, with the amount of water present in components (A) and/or (B) preferably being sufficient to cure the hydraulic inorganic binder which is present in component (C). More preferably the binder component (A) and the hardener component (B) comprise water, with the amount of water present in components (A) and (B) preferably being sufficient to cure the hydraulic inorganic binder.

It is clear that the fraction of a particular ingredient in the mixture of the components is dependent on the fraction of that ingredient in the component in question and on the mixing ratio of the components. Unless otherwise indicated, fractions or ratios of particular ingredients that are reported here are based on the appropriate or suitable weight fractions or weight ratios of the ingredients in the mixture of the components of the multicomponent composition. This composition is obtained, for example, by mixing of the components in suitable mixing ratios in accordance with usage instructions.

The binder component (A) comprises at least one epoxy resin and optionally a reactive diluent. The binder component (A) is preferably a liquid component. It may be viscous, but is generally pourable.

One epoxy resin or a mixture of two or more epoxy resins may be used. Epoxy resins which may be used are all epoxy resins customary within epoxy chemistry. Epoxy resins may be prepared, for example, in a known way from the oxidation of the corresponding olefins or from the reaction of epichlorohydrin with the corresponding polyols or polyphenols.

Epoxy resins can be divided into liquid epoxy resins and solid epoxy resins. The epoxy resin may have an epoxy equivalent weight, for example, of 156 to 500 g/eq. The epoxy resin is preferably a diepoxide. The epoxy resin is preferably a liquid resin.

In one embodiment, the epoxy resin may be an aromatic epoxy resin. Examples of resins suitable for this purpose are liquid epoxy resins of the formula (I),

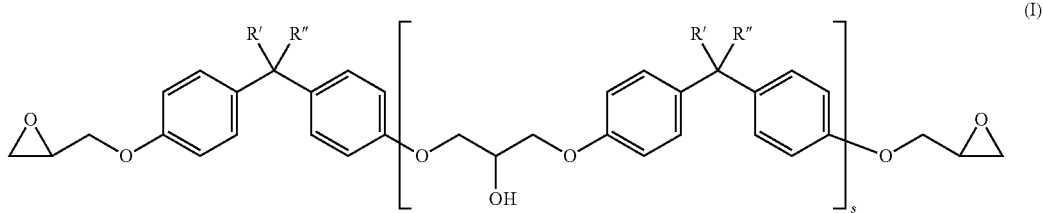

(I)

where R' and R" independently of one another are each a hydrogen atom or a methyl group, and s is on average a value from 0 to less than 2 and preferably 0 to 1. Preferred liquid resins are those of the formula (I) in which the index s is on average a value of less than 0.2.

The epoxy resins of the formula (I) are diglycidyl ethers of bisphenol A, bisphenol F and bisphenol A/F, with A being acetone and F being formaldehyde, which serve as reactants for the preparation of these bisphenols. Liquid epoxy resins of this kind are available commercially, as for example under the designations Araldite® from Huntsman, D.E.R.® from Dow, Epikote® from Momentive, Epalloy® from CVC, Chem Res® from Cognis, or Beckopox® from Cytec.

Further suitable aromatic epoxy resins are the products of glycidylization of:
  dihydroxybenzene derivatives such as resorcinol, hydroquinone, and pyrocatechol;
  other bisphenols or polyphenols such as bis(4-hydroxy-3-methylphenyl)methane, 2,2-bis(4-hydroxy-3-methylphenyl)propane (bisphenol-C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol-B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol-Z), 1,1-bis(4-hydroxyphenyl)-3,3,5-trimethylcyclohexane (bisphenol-TMC), 1,1-bis(4-hydroxyphenyl)-1-phenylethane, 1,4-bis[2-(4-hydroxyphenyl)-2-propyl]benzene (bisphenol-P), 1,3-bis[2-(4-hydroxyphenyl)-2-propyl]benzene (bisphenol-M), 4,4'-dihydroxybiphenyl (DOD), 4,4'-dihydroxybenzophenone, bis-(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether, bis(4-hydroxyphenyl) sulfone;
  condensation products of phenols with formaldehyde, obtained under acidic conditions, such as phenol novolaks or cresol novolaks;

aromatic amines, such as aniline, toluidine, 4-aminophenol, 4,4'-methylenediphenyldiamine (MDA), 4,4'-methylenediphenyldi(N-methyl)amine, 4,4'-[1,4-phenylene-bis(1-methylethylidene)]bisaniline (bisaniline-P), 4,4'-[1,3-phenylene-bis(1-methylethylidene)] bisaniline (bisaniline-M).

In a further embodiment, the epoxy resin may be an aliphatic or cycloaliphatic epoxy resin, such as, for example diglycidyl ether;

a glycidyl ether of a saturated or unsaturated, branched or unbranched, cyclic or open-chain $C_2$ to $C_{30}$ diol, such as ethylene glycol, propylene glycol, butylene glycol, hexanediol, octanediol, a polypropylene glycol, dimethylolcyclohexane, neopentyl glycol, for example;

a glycidyl ether of a tri- or tetrafunctional, saturated or unsaturated, branched or unbranched, cyclic or open-chain polyol such as castor oil, trimethylolpropane, trimethylolethane, pentaerythritol, sorbitol, or glycerol, and also alkoxylated glycerol or alkoxylated trimethylolpropane;

a hydrogenated liquid bisphenol A, F or A/F resin, and/or the products of glycidylization of hydrogenated bisphenol A, F or -A/F;

an N-glycidyl derivative of amides or heterocyclic nitrogen bases, such as triglycidyl cyanurate and triglycidyl isocyanurate, and also reaction products of epichlorohydrin and hydantoin.

Further examples of epoxy resins that can be used are epoxy resins prepared from the oxidation of olefins, as for example from the oxidation of vinylcyclohexene, dicyclopentadiene, cyclohexadiene, cyclododecadiene, cyclododecatriene, isoprene, 1,5-hexadiene, butadiene, polybutadiene, or divinylbenzene.

Other examples of epoxy resins which can be used are a solid bisphenol A, F or A/F resin constructed in the same way as for the aforementioned liquid epoxy resins of the formula (I), but with the index s having a value from 2 to 12. Other examples are all aforementioned epoxy resins, given a hydrophilic modification through reaction with at least one polyoxyalkylene polyol.

Preferred as epoxy resin are liquid resins, especially diepoxides, based on a bisphenol, more particularly based on bisphenol A, bisphenol F or bisphenol A/F, more preferably bisphenol F- and/or bisphenol A-epichlorohydrin resin, of the kind available commercially for example from Dow, Huntsman, and Hexion. These liquid resins have a viscosity which is low for epoxy resins, and in the cured state feature good properties as coatings. They may be used optionally in combination with solid bisphenol A resin or bisphenol F-Novolak-epoxy resin.

The binder component (A) may optionally comprise what is called a reactive diluent. This diluent, as stated, is counted as part of the epoxy resin for the epoxy resin weight. One or more reactive diluents may be used. Suitable reactive diluents are mono- and polyepoxides. The addition of a reactive diluent to the epoxy resin has the effect of reducing the viscosity, and also, in the cured state of the epoxy resin composition, of reducing the glass transition temperature and the mechanical values.

Examples of reactive diluents are glycidyl ethers of mono- or polyhydric phenols and aliphatic or cycloaliphatic alcohols, such as, in particular, the polyglycidyl ethers of diols or polyols, already stated as aliphatic or cycloaliphatic epoxy resins, and also, furthermore, in particular, phenyl glycidyl ether, cresyl glycidyl ether, p-n-butylphenyl glycidyl ether, p-tert-butylphenyl glycidyl ether, nonylphenyl glycidyl ether, allyl glycidyl ether, butyl glycidyl ether, hexyl glycidyl ether, 2-ethylhexyl glycidyl ether, and also glycidyl ethers of natural alcohols, such as, for example, $C_8$ to $C_{10}$ alkyl glycidyl ethers, $C_{12}$ to $C_{14}$ alkyl glycidyl ethers, or $C_{13}$ to $C_{15}$ alkyl glycidyl ethers, available commercially as Erisye® GE-7, Erisys® GE-8 (from CVC), or as Epilox® P 13-19 (from Leuna).

In one preferred embodiment the binder component (A) is an aqueous binder component (A), i.e., it comprises water. The binder component (A) preferably comprises an aqueous epoxy resin dispersion, it being possible for this to be an epoxy resin emulsion, a so-called "emulsifiable epoxy resin", or an epoxy resin suspension.

An epoxy resin dispersion comprises preferably, besides water, at least one epoxy resin, as stated above, and additionally at least one emulsifier, more particularly a nonionic emulsifier. Epoxy resin dispersions or emulsions may have a solids content, for example, in the range from 40-70 wt %.

Commercial epoxy resin dispersions are, for example, Sika® Repair/Sikafloor® EpoCem® Modul A (from Sika Schweiz AG), Araldite® PZ 323, Araldite® PZ 756/67, Araldite® PZ 3961 (from Huntsman), XZ 92598.00, XZ 92546.00, XZ 92533.00 (from Dow), Waterpoxy® 1422, Waterpoxy® 1455 (from Cognis), Beckopox® EP 384w, Beckopox® EP 385w, Beckopox® EP 386w, Beckopox® EP 2340w, Beckopox® VEP 2381w (from Cytec).

An emulsifiable epoxy resin preferably comprises at least one emulsifier, as already mentioned above as a constituent of an epoxy resin dispersion. Commercial emulsifiable epoxy resins are, for example, Araldite® PY 340 and Araldite® PY 340-2 (from Huntsman), Beckopox® 122w and Beckopox® EP 147w (from Cytec).

For the purposes of the present invention it is preferred if the binder component (A) is aqueous, with the ratio of epoxy resin, including any reactive diluent used, to water being preferably in the range from 3:1 to 1:1. The epoxy resin is preferably emulsifiable in water.

The binder component (A) may optionally comprise one or more other additives. Suitable additives are elucidated further on below.

The hardener component (B) comprises at least one amine compound as amine hardener. The hardener component (B) is preferably an aqueous hardener component (B), i.e., it comprises water. The aqueous hardener component (B) is preferably a liquid component. It may be viscous, but is generally pourable.

The amine compound as amine hardener may be any amine compound commonly used in the art as a hardener for epoxy resins. Such hardeners are available commercially. One amine compound or two or more amine compounds may be used. Suitable in principle as amine compounds are monoamines, provided the amine is a primary amine, but compounds having at least two amine groups are more preferred. The amino groups may be primary and/or secondary amino groups.

Preferred amine compounds as amine hardeners are polyamines, this also including polyaminoamides and adducts with polyepoxides. Examples of suitable amine compounds as amine hardeners are therefore a polyamine, a polyaminoamide, a polyamine-polyepoxide adduct, or a polyaminoamide-polyepoxide adduct, and mixtures thereof, each preferably comprising at least two amino groups. Suitable polyamines are aliphatic, cycloaliphatic, heterocyclic, and aromatic polyamines. The polyamine used as amine hardener is preferably a water-soluble or water-dispersible polyamine, including corresponding polyaminoamides and adducts with polyepoxides.

Particularly suitable polyamines are especially the following polyamines:

- aliphatic, cycloaliphatic or arylaliphatic primary diamines, such as, in particular, ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11 neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis(4-aminocyclohexyl)methane (H12-MDA), bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis(aminomethyl)cyclohexane, 2,5(2,6)-bis(aminomethyl)bicyclo[2.2.1]-heptane (NBDA), 3(4),8(9)-bis(aminomethyl)tricyclo[5.2.1.0$^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane, and 1,3- and 1,4-bis(aminomethyl)benzene;
- aliphatic, cycloaliphatic or arylaliphatic primary triamines, especially 4-aminomethyl-1,8-octanediamine, 1,3,5-tris(aminomethyl)benzene, 1,3,5-tris(aminomethyl)cyclohexane, tris(2-aminoethyl)amine, tris(2-aminopropyl)amine, tris(3-aminopropyl)amine;
- aliphatic primary diamines containing ether groups, especially bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis(3-aminopropyl)polytetrahydrofurans and other polytetrahydrofurandiamines, and polyoxyalkylenediamines. The latter are typically products from the amination of polyoxyalkylenediols and are obtainable, for example, under the Jeffamine® name (from Huntsman), under the Polyetheramine name (from BASF) or under the PC Amine® name (from Nitroil). Especially suitable polyoxyalkylenediamines are Jeffamine® D 230, Jeffamine® D 400, Jeffamine® D 2000, Jeffamine® D 4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650 and PC Amine® DA 2000;
- primary polyoxyalkylenetriamines, which are typically products from the amination of polyoxyalkylenetriols and are obtainable, for example, under the Jeffamine® trade name (from Huntsman), under the Polyetheramine name (from BASF) or under the PC Amine® name (from Nitroil), for example Jeffamine® T 403, Jeffamine® T 3000, Jeffamine® T 5000; Polyetheramine T403, Polyetheramine T5000 and PC Amine® TA 403;
- polyamines having tertiary amino groups and having two primary aliphatic amino groups, such as, in particular, N,N'-bis(aminopropyl)piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine, and also the products from the double cyanoethylation and subsequent reduction of fatty amines derived from natural fatty acids, such as N,N-bis(3-aminopropyl)dodecylamine and N,N-bis(3-aminopropyl)tallowalkylamine, obtainable as Triameen® Y12D and Triameen® YT (from Akzo Nobel);
- polyamines having tertiary amino groups and having three primary aliphatic amino groups, such as, in particular, tris(2-aminoethyl)amine, tris(2-amino-propyl)amine and tris(3-aminopropyl)amine;
- polyamines having secondary amino groups and having two primary aliphatic amino groups, such as, in particular, 3-(2-aminoethyl)amino-propylamine, bishexamethylenetriamine (BHMT), diethylenetriamine (DETA), triethylenetetramine (TETA), tetraethylenepentamine (TEPA), pentaethylenehexamine (PEHA) and higher homologs of linear polyethylenamines such as polyethylenepolyamine having 5 to 7 ethylenamine units (known as "higher ethylenepolyamine", HEPA), products from the multiple cyanoethylation or cyanobutylation and subsequent hydrogenation of primary di- and polyamines having at least two primary amino groups, such as dipropylenetriamine (DPTA), N-(2-aminoethyl)-1,3-propanediamine (N3 amine), N,N'-bis(3-aminopropyl)ethylenediamine (N4 amine), N,N'-bis(3-aminopropyl)-1,4-diaminobutane, N5-(3-aminopropyl)-2-methyl-1,5-pentanediamine, N3-(3-aminopentyl-1,3-pentanediamine, N5-(3-amino-1-ethylpropyl)-2-methyl-1,5-pentanediamine and N,N'-bis(3-amino-1-ethylpropyl)-2-methyl-1,5-pentanediamine;
- polyamines having one primary and one secondary amino group, such as, in particular, N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, N-(2-aminoethyl)piperazine, N-methyl-1,3-propanediamine, N-butyl-1,3-propanediamine, N-(2-ethylhexyl)-1,3-propanediamine, N-cyclohexyl-1,3-propanediamine, 3-methylamino-1-pentylamine, 3-ethylamino-1-pentylamine, 3-cyclohexylamino-1-pentylamine, fatty diamines such as N-cocoalkyl-1,3-propanediamine and products from the Michael-like addition reaction of primary aliphatic diamines with acrylonitrile, maleic diesters or fumaric diesters, citraconic diesters, acrylic and methacrylic esters, acryl- and methacrylamides and itaconic diesters, converted in a molar ratio of 1:1, and additionally products from the partial reductive alkylation of primary aliphatic polyamines with benzaldehyde or alter aldehydes or ketones, and partially styrenized polyamines such as Gaskamine® 240 (from Mitsubishi Gas Chemical (MGC));
- aromatic polyamines, such as, in particular, m- and p-phenylenediamine, 4,4'-, 2,4' and 2,2'-diaminodiphenylmethane, 3,3'-dichloro-4,4'-diaminodiphenylmethane (MOCA), tolylene-2,4- and -2,6-diamine, mixtures of 3,5-dimethylthiotolylene-2,4- and -2,6-diamine (obtainable as Ethacure® 300 from Albemarle), mixtures of 3,5-diethyl-2,4- and -2,6-tolylenediamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenyl sulfone (DDS), 4-amino-N-(4-aminophenyl)benzenesulfonamide, 5,5'-methylenedianthranilic acid, dimethyl 5,5'-methylene-dianthranilate, propylene 1,3-bis(4-aminobenzoate), butylene 1,4-bis(4-aminobenzoate), polytetramethylene oxide bis(4-aminobenzoate) (obtainable as Versalink® from Air Products), 1,2-bis(2-aminophenylthio)-ethane, 2-methylpropyl 4-chloro-3,5-diaminobenzoate and tert-butyl 4-chloro-3,5-diaminobenzoate;

adducts of the polyamines mentioned with epoxides and epoxy resins, especially adducts with diepoxides in a molar ratio of at least 2/1, adducts with monoepoxides in a molar ratio of at least 1/1, and reaction products of amines and epichlorohydrin, especially that of 1,3-bis (aminomethyl)-benzene, commercially available as Gaskamine® 328 (from MGC);

polyamidoamines which are reaction products of a mono- or polybasic carboxylic acid, or the esters or anhydrides thereof, especially of a dimer fatty acid, and an aliphatic, cycloaliphatic or aromatic polyamine used in a stoichiometric excess, especially a polyalkylenamine, for example DETA or TETA, especially the commercially available polyamidoamines Versamid® 100, 125, 140 and 150 (from Cognis), Aradur® 223, 250 and 848 (from Huntsman), Euretek® 3607 and 530 (from Huntsman) and Beckopox® EH 651, EH 654, EH 655, EH 661 and EH 663 (from Cytec); and phenalkamines, also called Mannich bases, which are reaction products of a Mannich reaction of phenols, especially cardanol, with aldehydes, especially formaldehyde, and polyamines, especially the commercially available phenalkamines Cardolite® NC-541, NC-557, NC-558, NC-566, Lite 2001 and Lite 2002 (from Cardolite), Aradur® 3440, 3441, 3442 and 3460 (from Huntsman) and Beckopox® EH 614, EH 621, EH 624, EH 628 and EH 629 (from Cytec).

Preferred polyamines are polyamines selected from the group consisting of 1,3-pentanediamine (DAMP), 1,5-diamino-2-methylpentane (MPMD), 2-butyl-2-ethyl-1,5-pentanediamine (C11 neodiamine), 1,6-hexanediamine, 2,2,4- and 2,4,4-trimethylhexamethylenediamine (TMD), 1,2-dodecanediamine, 1,3-diaminocyclohexane, bis(4-aminocyclohexyl)methane (H12-MDA), bis(4-amino-3-methylcyclohexyl)methane, 1-amino-3-aminomethyl-3,5,5-trimethyl-cyclohexane (IPDA), 1,3-bis(aminomethyl)cyclohexane, 1,3-bis(aminomethyl)-benzene (MXDA), bishexamethylenetriamine (BHMT), diethylenetriamine (DETA), triethylenetetramine (TETA), tetraethylenepentamine (TEPA), pentaethylenehexamine (PEHA) and higher homologs of linear polyethylenamines such as polyethylenepolyamine having 5 to 7 ethylenamine units (HEPA), dipropylenetriamine (DPTA), N-(2-aminoethyl)-1,3-propane-diamine (N3 amine), N,N'-bis(3-aminopropyl)ethylenediamine (N4 amine), polyoxyalkylenediamines and polyoxyalkylenetriamines having a molecular weight in the range from 200 to 500 g/mol, especially the Jeffamine® D-230, Jeffamine® D-400 and Jeffamine® T-403 types, polyanilidoamines, phenalkamines, compounds of the polyamines mentioned which have been fully or partially alkylated at primary amino groups, and adducts of the polyamines mentioned with epoxides and epoxy resins. These preferred polyamines have particularly good compatibility with epoxy resins.

Polyamines very particularly preferred in connection with the present invention are aliphatic polyamines. An especially preferred amine is 1-amino-3-aminomethyl-3,5,5-trimethyl-cyclohexane, alone or in a mixture with 2,2'-dimethyl-4,4'-methylene(cyclohexanamine).

For the purposes of the present invention, the hardener component (B) may consist exclusively of the stated amines. As mentioned, however, it is preferred for the hardener component (B) to comprise water. Optionally there may be one or more additives present in the hardener component (B), such as defoamers in particular. Other suitable optional additives for the hardener component (B) are elucidated later on below.

It is preferred for the hardener component (B) to comprise 1 to 25 wt %, more particularly 2 to 20 wt %, of the at least one amine compound as amine hardener. The balance fraction to 100 wt % consists in this case preferably of water and optionally one or more additives, such as defoamers.

Preference is given to using as component (B) aqueous amine hardeners which are employed for self-leveling coating systems. Examples of suitable commercial products are Epilink®701 from AirProducts, Incorez®148/700 from Incorez, and D.E.H.® 804 from Dow Chemical Co.

Further optional additives which may be present in the binder component (A) and/or in the hardener component (B) are additives customarily used within this field, such as, for example, nonreactive diluents, solvents, or film-forming assistants; reactive diluents and extenders, examples being reactive diluents containing epoxy groups, as already mentioned above; polymers, thermoplastic polymers; inorganic and organic fillers, such as ground or precipitated calcium carbonates, barite, talcs, finely ground quartzes, silica sand, dolomites, wollastonites, kaolins, micas, aluminum oxides, aluminum hydroxides, silicas, PVC powders, or hollow beads, for example; fibers; accelerators which accelerate the reaction between amino groups and epoxide groups, examples being acids or compounds that can be hydrolyzed to acids; tertiary amines and salts thereof; quaternary ammonium salts; rheology modifiers, such as thickeners, for example; adhesion promoters, such as organoalkoxysilanes, for example; stabilizers to counter heat, light, or UV radiation; flame retardants; surface-active substances, such as wetting agents, flow control agents, deaerating agents, or defoamers, for example; and biocides.

Component (C) is a solid component and is preferably pulverulent. The solid component (C) comprises a hydraulic inorganic binder. Hydraulic inorganic binders are inorganic or mineral binders which can be hardened with water even underwater.

The hydraulic inorganic binder is a ternary binder composed of high-alumina cement, calcium sulfate, and optionally Portland cement. Ternary binders of these kinds are known and feature short setting times and high early strengths.

One or more high-alumina cements may be used. High-alumina cements are calcium aluminate cements. They are based in general on limestone and bauxite and can be produced by a fusion process or a sintering process. The high-alumina cement produced by the fusion process is also referred to as fusion high-alumina cement. DIN EN 14647 details composition and requirements for high-alumina cement. It is of course also possible to use high-alumina cements conforming to other standards.

The calcium sulfate may be used in the form of the anhydrite ($CaSO_4$), dihydrate ($CaSO_4.2H_2O$), hemihydrate ($CaSO_4.0.5H_2O$), or a mixture thereof, the hemihydrate being preferred.

Where employed, one or more Portland cements may be used. Portland cement is the most frequently used cement. Worldwide there are standards and norms in existence, an example being the European standard DIN EN 197, that describe composition, requirements, and conformance criteria. Suitable in particular are CEM I Portland cements to DIN EN 197, as for example Portland cement I-42.5 R or I-52.5. It is of course also possible to use Portland cements conforming to other foreign standards, as for example ASTM standard or the Indian standard.

The ternary binder may be free from Portland cement. In one embodiment, however, the ternary binder comprises Portland cement, in an amount, for example, of at least 0.1 wt % and preferably of at least 1 wt %, based on the total weight of component (C).

The solid component (C) comprises 2 to 30 wt % of high-alumina cement, 1 to 16 wt % of calcium sulfate, preferably the hemihydrate, and 0 to 20 wt % of Portland cement. The solid component (C) comprises preferably 5 to 20 wt % of high-alumina cement, 3 to 13 wt % of calcium sulfate, preferably the hemihydrate, and 3 to 10 wt % of Portland cement. The amount of ternary binder in the solid component (C) may vary as required, but is preferably in the range from 3 to 40 wt % and more preferably 10 to 35 wt %. The amounts figures are based in each case on the total weight of component (C).

The ratios between high-alumina cement, calcium sulfate, and optionally Portland cement can be modified in order to set setting time, early strength, rapid drying, and shrinkage compensation to the desired values.

The solid component (C) may comprise further inorganic or mineral binders, magnesia binders for example, but in general this is not preferred.

The solid component (C) preferably comprises at least one filler, preferably sand and more particularly silica sand. Fillers are chemically inert, solid, particulate materials and are available in various forms, sizes, and as different materials, ranging from fine sand particles to large rough stones. Examples of suitable fillers are sand, gravel, comminuted stones, slag, calcined flints, clay, pumice, pearlite, vermiculite, aluminum oxide, calcium carbonate, fibers, more particularly polymer fibers, and amorphous silica (fumed silica). The filler preferably comprises sand, more particularly silica sand, since in this way the workability of the composition can be set advantageously and a planar surface can be ensured.

The particle size of the fillers is preferably relatively small, i.e., less than 5 mm. The fillers may have for example a particle size in the range from 0.05 mm to 2.5 mm, with particular preference being given to sand, especially silica sand. For example, the use of sand with a particle size in the range from 0.05 to 0.3 mm, 0.1 to 0.6 mm, 0.3 to 0.9 mm, 0.7 mm to 1.2 mm, and 1.5 to 2.2 mm, or of a mixture thereof, is associated with advantages. The particle size may be determined with the aid of sieve analysis.

The filler content in the solid component may vary within wide ranges, but is preferably at least 36 wt %, more preferably at least 50 wt %, and with preference at least 57 wt %, there being preferably not more than 90 wt % and more preferably not more than 89 or not more than 85 wt % of fillers present.

The solid component (C) comprises preferably 2 to 30 wt % of high-alumina cement, 1 to 16 wt % of calcium sulfate, 0 to 20 wt % of Portland cement, and 36 to 90 wt % of fillers. With particular preference the solid component (C) comprises 5 to 20 wt % of high-alumina cement, 3 to 13 wt % of calcium sulfate, 3 to 10 wt % of Portland cement, and 57 to 89 wt % of fillers. The amounts figures are based in each case on the total weight of component (C).

The solid component may optionally comprise one or more further additives, which are immediately familiar to a person skilled in the art of mortar and concrete technology. Examples are agents for reducing shrinkage, such as calciumsulfoaluminates and/or neopentyl glycol, for example, plasticizers, thickeners, thixotropic agents, emulsifiers, flow agents, air entrainers, water retention agents, hydrophobizing agents, standardizing agents, accelerators and/or retardants, which may be added by the person skilled in the art depending on the intended use properties.

The fraction of the additives in the solid component (C), based on the total weight of component (C), ought preferably not to exceed 10 wt %. More preferably the total amount of the additives ought to be 5 wt % or less, more particularly 3 wt % or less.

In one embodiment, the multicomponent composition according to the invention may optionally comprise a polymeric binder which is solid at 23° C. The solid polymeric binder can be used to gain further improvements in properties such as compressive strength and shrinkage, for example. The solid polymeric binder is preferably a binder based on a water-dispersible powder. The polymeric binder may further comprise small amounts of an emulsifier, such as polyvinyl alcohol. The particle size of the solid polymeric binder is preferably in the range from 0.1 to 50 µm, more preferably in the range from 1 to 15 µm.

The polymeric binder which is solid at 23° C. is preferably an ethylene-vinyl acetate copolymer which may optionally comprise one or more further comonomers. If used, the polymeric binder which is solid at 23° C. is present in the multicomponent composition preferably with an amount of 0.1 to 10 wt %, more preferably 0.25 to 3 wt %, based on the total weight of the multicomponent composition. Solid polymeric binders of this kind are available commercially, examples being the Vinnapaa® products from Wacker AG.

The polymeric binder which is solid at 23° C. may be present in the solid component (C) and/or in an additional component. Optionally, however, the solid polymeric binder may also be present in the binder component (A) or in the hardener component (B).

As already elucidated, the multicomponent composition, in addition to the three components stated, may include further, additional components, if required, although this is not preferred. Examples of such optional additional components are components which are or which comprise, for example, water, fillers, pigments, and solid polymeric binders. The water needed in order to cure the ternary binder may be present, for example, wholly or partly as a standalone component, which is only added when the components are mixed prior to use, in order to set the desired quantity of water. Preferably, however, the required quantity of water is already present in component (A) and/or in component (B).

The total amount of epoxy resin, including any reactive diluent used, and of amine hardener in the multicomponent composition may vary within wide ranges, but in general is not more than 4 wt %, preferably not more than 3 wt %, more preferably not more than 2 wt % or not more than 1.5 wt %, based on the total weight of the multicomponent composition. The total amount of epoxy resin, including any reactive diluent used, and of amine hardener in the multicomponent composition is preferably at least 0.1 wt % and more preferably at least 0.5 wt %, based on the total weight of the multicomponent composition.

The mixing ratio between the binder component (A) and the hardener component (B) may vary within broad ranges. This ratio is preferably selected such that in the multicomponent composition the stoichiometric ratio of amine functionality to epoxide functionality ought to be in the range from 1.1:1 to 0.9:1. Preferably the ratio is approximately 1:1.

It is further preferred for the solid component (C) to constitute the major fraction of the multicomponent composition, e.g. about 70 to about 95 wt %, preferably about 75 to about 90 wt %, of the multicomponent composition.

The invention also provides a method for coating, joining, sealing, or grouting components with a multicomponent composition of the invention as described above, the method comprising the following method steps:
a) mixing the binder component (A) and the hardener component (B),
b) adding the solid component (C) to the mixture obtained in step a), with stirring, to give a binder mixture,
c) processing the resulting binder mixture by
   c1) applying the binder mixture to the surface of one or more components for coating,
   c2) applying the binder mixture to the surface of one or more components and placing one or more further components onto the applied binder mixture in order to join the components, or
   c3) introducing the binder mixture into the space between two or more components for sealing or grouting,
d) optionally smoothing and/or deaerating the applied or introduced binder mixture, and
e) curing the binder mixture,
where water is present in the binder component (A) and/or in the hardener component (B) and/or is added as a separate component before or during the addition of the solid component (C).

As elucidated, the multicomponent composition may also comprise one or more additional components. The nature and sequence of addition of the additional components to the mixture of the composition is arbitrary, though preferably one or more additional liquid components, if used, are admixed in step a). One or more additional solid components, if used, are admixed preferably in step b).

The processing of the binder mixture and the curing may take place for example at temperatures in the range from 5 to 35° C.

The component for coating may be a substrate of any desired material, more particularly the materials customary for building, such as concrete, stones, masonry, rendering, wood, glass, or metal, for example.

The component preferably comprises a floor, made of concrete, mortar, screed, or stones, for example, with the coating of the composition of the invention forming a floor covering. With particular preference it is a self-leveling floor covering. The floor may have been provided with a priming coat. A further possibility is to apply a top coat as seal to the cured binder mixture applied.

For the joining, sealing, or grouting of components, the multicomponent composition of the invention may be used in a customary way, as mortar or repair mortar, for example.

The curing reaction begins with the mixing of the multicomponent composition. The epoxy groups of the epoxy resin and optionally of the reactive diluent react with the amine groups to form the organic binder matrix, while the hydraulic inorganic binder with the water forms the inorganic binder matrix, involving hydration reactions; as a result of all of these reactions, the composition ultimately cures. Accordingly the present invention also describes products which comprise a cured composition of the invention, obtainable by the method described above.

The invention also provides for the use of the multicomponent composition of the invention as screeds, masonry, plaster, mortar, and repair mortar, preferably as a coating composition, more particularly as a self-leveling flooring compound for a floor covering, or as mortar.

Examples follow for elucidating the invention, these examples, however, being in no way intended to restrict the scope of the invention.

EXAMPLES

Components used for producing the compositions were as follows.
Binder Component A
  Epoxy resin component as an emulsion composed of about 62 wt % of an epoxy resin mixture of diglycidyl ether of bisphenol A/F and 38 wt % of water.
Hardener Component B1
  Mixture of 2.4 wt % of a modified amine hardener based on 1-amino-3-aminomethyl-3,5,5-trimethylcyclohexane, 0.1 wt % of a defoamer, and 97.5 wt % of water.
Hardener component B2
  Mixture of 18 wt % of a modified amine hardener based on 1-amino-3-aminomethyl-3,5,5-trimethylcyclohexane, 0.75 wt % of a defoamer, and 81.25 wt % of water. In terms of the constituents, the hardener component B2 corresponds to the hardener component B1, but in respect of the amine compound it is more highly concentrated.
Solid Component C
  Two solid components, C1 and C2, were produced, in accordance with the composition indicated in Table 1.

TABLE 1

| Solid component | C1 (Parts by weight) | C2 (Parts by weight) |
| --- | --- | --- |
| Portland cement I 42.5R | 33 | — |
| Portland cement I 52.5R | — | 6 |
| Calcium sulfate[1] | — | 8 |
| High-alumina cement[2] | — | 14 |
| Silica sand[3] | 62 | 58 |
| Calcium carbonate | 2 | 10 |
| Shrinkage reducer[4] | 1 | 1 |
| Further additives[5] | 2 | 3 |

[1] Alpha-hemihydrate
[2] Ternal ® LC from Kerneos
[3] Particle sizes in the range of 0.06-0.6 mm
[4] Based on calcium sulfoaluminate and neopentyl glycol
[5] Fibers, thickener, amorphous silica, chromate reducer, defoamer, accelerator, and retardant Binder component A and hardener component B were mixed with one another. Then a solid component C was added to give a homogeneous mixture. For comparative example 2 and inventive example 1, the addition of the solid component C was accompanied by addition of Vinnapas® 7220N from Wacker AG, a water-redispersible ethylene-vinyl acetate copolymer, in a fraction of about 2.5 wt %, based on the total weight of the mixture. The Vinnapas® may equally well be accommodated directly in corresponding amount in component C, in which case no additional component is needed. The compositions thus produced were tested for their workability, shrinkage characteristics, compressive strength, and adhesive strength. For this purpose, coatings on a concrete substrate and test specimens were produced using the mixtures obtained.

The workability was determined by applying the composition to a conventional concrete paving slab and processing it thereon. The workability was specified by the worker as a value on a scale from 1 to 4, on which 1 represents the poorest value and 4 the best value.

The shrinkage characteristics were determined in accordance with standard EN 12617-4 on 4×4×16 cm prisms. The prisms were cured for 28 days prior to measurement.

The compressive strength was determined in accordance with standard EN 12190 on 4×4×16 cm prisms. The prisms were cured for 28 days prior to measurement.

The adhesive strength was determined in accordance with standard EN 1542 on a sandblasted concrete garden slab. Prior to measurement, the composition was cured on the slab for 28 days.

The surface moisture of a coating of the composition applied to concrete was determined using a moisture meter from Tramex, where the moisture content is determined by means of an electronic impedance measurement.

Measurements were carried out on the applied coating at regular intervals. The time from application of the coating until a moisture content of 4% was reached was ascertained.

The components used, mixing ratios, and results are shown in Table 2 below.

TABLE 2

|  | Comparative example 1 | Comparative example 2 | Inventive example 1 |
|---|---|---|---|
| Component A | A | A | A |
| Component B | B2 | B1 | B1 |
| Component C | C1 | C1 | C2 |
| Mixing ratio A:B:C (weight) | 1:2.5:18.5 | 1:14:84 | 1:7:60 |
| Epoxy resin + amine hardener, wt %[1)] | about 4 | about 1 | about 1 |
| Workability | 1 | 4 | 2 |
| Compressive strength, in MPa | 58 | 40.9 | 61.4 |
| Shrinkage, in ‰ | −0.948 | −0.637 | −0.142 |
| Adhesive strength, in MPa | 3.9 | 2.1 | 2.77 |
| Surface moisture (time to moisture content of 4%) | 19 h | >45 h | 2 h |

[1)]based on the total weight of the mixture

Systems of this kind are typically required to exhibit compressive strength of at least 50 MPa, shrinkage of less than 0.6 mm/m, adhesive strength of at least 2 MPa, and attainment of a moisture content of 4% within 24 hours.

From the table above it is evident that the use of the ternary binder allows substantial improvement to the properties of the multicomponent composition of the invention in respect of shrinkage, compressive strength, and adhesive strength, and also in respect of surface moisture. The surface moisture is reduced to below 4% within a short time, thus allowing recoating to take place rapidly.

The multicomponent composition of the invention features very quick setting times, producing relatively short working times. For numerous applications, however, the working times are sufficient. The setting time can be influenced by varying the proportions of the components of the ternary binder. Overall, however, the workability of inventive example 1 is significantly better by comparison with comparative example 1, which has a customary organic binder content, and the compound is also less tacky and therefore easier to apply. Relative to comparative example 1 there is also a significantly reduced shrinkage.

It is found, accordingly, that through use of a ternary binder as defined it is possible to improve the properties of multicomponent ECC systems in some cases significantly.

The invention claimed is:
1. A multicomponent composition comprising:
A) a binder component (A) comprising at least one epoxy resin of formula (I), wherein R' and R" independently of one another are each a hydrogen atom or a methyl group, and s is an average value of from 0 to less than 2,

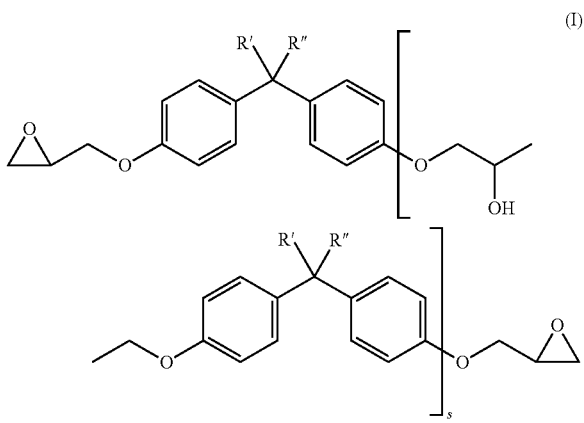

B) a hardener component (B) comprising at least one amine compound as an amine hardener, and
C) a solid component (C) comprising a hydraulic inorganic binder,
wherein the hydraulic inorganic binder is a ternary binder comprised of high-alumina cement, calcium sulfate, and optionally Portland cement, and wherein the solid component (C) comprises 2 to 30 wt % of high-alumina cement, 1 to 16 wt % of calcium sulfate, and 0 to 20 wt % of Portland cement.

2. The multicomponent composition as claimed in claim 1, wherein the total amount of epoxy resin and amine hardener in the multicomponent composition, based on the total weight of the multicomponent composition, is not more than 4 wt %.

3. The multicomponent composition as claimed in claim 1, wherein the ternary binder comprises Portland cement, and the solid component (C) comprises 5 to 20 wt % of high-alumina cement, 3 to 13 wt % of calcium sulfate, and 3 to 10 wt % of Portland cement.

4. The multicomponent composition as claimed in claim 1, wherein the calcium sulfate is selected from the group consisting of anhydrite, dihydrate, hemihydrate, or a mixture thereof.

5. The multicomponent composition as claimed in claim 1, wherein the binder component (A) and/or the hardener component (B) comprise water.

6. The multicomponent composition as claimed in claim 1, wherein the solid component (C) comprises one or more fillers, and optionally one or more additives.

7. The multicomponent composition as claimed in claim 1, wherein the total amount of epoxy resin and amine hardener in the multicomponent composition, based on the total weight of the multicomponent composition, is not less than 0.1 wt %.

8. The multicomponent composition as claimed in claim 1, wherein the fraction of the ternary binder in the solid component (C) is in the range of 3 to 40 wt %.

9. The multicomponent composition as claimed in claim 1, wherein the at least one epoxy resin comprises at least one epoxy resin and a reactive diluent.

10. The multicomponent composition as claimed in claim 1, wherein the at least one amine compound is a polyamine, a polyaminoamide, a polyamine-polyepoxide adduct, a polyaminoamide-polyepoxide adduct, or a mixture of at least two of these compounds.

11. The multicomponent composition as claimed in claim 1, wherein the multicomponent composition comprises a polymeric binder which is solid at 23° C.

12. A method for coating, joining, sealing, or grouting components with a multicomponent composition as claimed in claim 1, the method comprising the following method steps:
   a) mixing the binder component (A) and the hardener component (B),
   b) adding the solid component (C) to the mixture obtained in step a), with stirring, to give a binder mixture,
   c) processing the resulting binder mixture by
      c1) applying the binder mixture to the surface of one or more components for coating,
      c2) applying the binder mixture to the surface of one or more components and placing one or more further components onto the applied binder mixture in order to join the components, or
      c3) introducing the binder mixture into the space between two or more components for sealing or grouting,
   d) optionally smoothing and/or deaerating the applied or introduced binder mixture, and
   e) curing the binder mixture,
   wherein water is present in the binder component (A) and/or in the hardener component (B) and/or is added as a separate component before or during the addition of the solid component (C).

13. The method as claimed in claim 12, wherein in step a) one or more additional liquid components are admixed and/or in step b) one or more additional solid components are admixed.

14. A product comprising one or more components coated, joined, sealed, or grouted with a cured binder mixture, obtained by a method as claimed in claim 12.

15. A coating composition comprising the multicomponent composition as claimed in claim 1.

16. The multicomponent composition as claimed in claim 2, wherein total amount of epoxy resin and amine hardener is not more than 3 wt %.

17. The multicomponent composition as claimed in claim 2, wherein total amount of epoxy resin and amine hardener is not more than 2 wt %.

18. The multicomponent composition as claimed in claim 4, wherein the calcium sulfate is the hemihydrate.

19. The multicomponent composition as claimed in claim 5, wherein the amount of water present in compounds (A) and/or (B) is sufficient to cure the hydraulic inorganic binder.

20. The multicomponent composition as claimed in claim 6, wherein at least one of the one or more fillers is sand.

21. The multicomponent composition as claimed in claim 6, wherein the filler content in component (C) is at least 36 wt %.

22. The multicomponent composition as claimed in claim 6, wherein the filler content in component (C) is at least 57 wt %.

23. The multicomponent composition as claimed in claim 11, wherein the polymeric binder is an ethylene-vinyl acetate copolymer optionally comprising one or further comonomers.

24. A self-leveling flooring compound for a floor covering, the compound comprising the multicomponent composition as claimed in claim 1.

25. A mortar compound comprising the multicomponent composition as claimed in claim 1.

* * * * *